United States Patent Office 3,825,469
Patented July 23, 1974

3,825,469
BORON CARBIDE FIBER PRODUCTION
James Economy, Eggertsville, and Vlado I. Matkovich,
Williamsville, N.Y., assignors to The Carborundum
Company, Niagara Falls, N.Y.
No Drawing. Original application Nov. 14, 1969, Ser. No.
877,036, now Patent No. 3,725,533. Divided and this
application July 3, 1972, Ser. No. 268,421
Int. Cl. C01b 31/36; D02g 3/02
U.S. Cl. 161—172                               9 Claims

ABSTRACT OF THE DISCLOSURE

Boric oxide fibers having a maximum diameter of about 10 microns are heated in an ammonia atmosphere to about 350–600° C. at a rate of temperature rise of up to about 5000° C./hr. to produce ammonia-treated fibers consisting essentially of B, N, O and H. The ammonia-treated fibers are heated in an amine atmosphere at about 600–1000° C. to produce amine-treated fibers consisting essentially of B, C, N, O and H and containing at least about 15% C. The amine-treated fibers may be heated at about 2000–2350° C. in an inert atmosphere to produce boron carbide fibers.

---

This is a division, of copending application Ser. No. 877,036, filed Nov. 14, 1969, now Pat. No. 3,725,533.

BACKGROUND OF THE INVENTION

This invention relates to a process for the production of fibers useful as intermediates in the production of boron carbide fibers, to such intermediate fibers, and to a process for the production of boron carbide fibers employing such intermediate fibers.

In recent years, there has been a rapidly increasing interest in the development of various types of inorganic fibers. Such fibers have a wide variety of utilities, and are perhaps of principal interest in connection with the fabrication of strong, lightweight structural materials, primarily for aircraft and aerospace vehicles, such materials comprising a matrix of metal, ceramic or plastic reinforced by the incorporation therein of inorganic fibers.

Boron carbide is one of the more interesting inorganic substances of which fibers may be composed by virtue of its resistance to elevated temperatures, oxidation, and corrosive environments. U.S. Patent 3,269,802 discloses, inter alia, a method according to which carbon fibers are heated in an atmosphere of boron trichloride and hydrogen, whereby boron carbide fibers are produced. Such fibers are useful in the fabrication of boron carbide fiber-reinforced composites by conventional techniques. They also find use in the fabrication of filter media which may be employed at high temperatures in corrosive environments, heat and flame resistant fabrics, and catalyst supports.

SUMMARY OF THE INVENTION

The present invention is primarily concerned with a novel process for the production of boron carbide fibers. It is also concerned with a novel process for the preparation of intermediate fibers useful in the production of boron carbide fibers, and with such intermediate fibers.

In accordance with the present invention, a fiber consisting essentially of boric oxide and having a maximum diameter of about 10 microns is heated in an ammonia atmosphere up to a final temperature of from about 350° C. to about 600° C., at a rate of temperature rise which is preferably at least about 5° C./hr. but which may be as rapid as about 5000° C./hr. Under the specified conditions, the ammonia reacts in a complex manner with the boric oxide to produce a fiber which consists essentially of boron (B), nitrogen (N), oxygen (O) and hydrogen (H). Such a fiber, produced as stated, is hereinafter referred to as an ammonia-treated fiber to distinguish it conveniently from the various other types of fibers discussed herein.

Further, in accordance with the present invention, an ammonia-treated fiber as described is heated at a temperature of from about 600° C. to about 1000° C. in an atmosphere of a primary, secondary or tertiary aliphatic amine having the formula

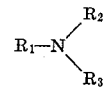

wherein $R_1$ is methyl, ethyl, propyl or allyl, $R_2$ is hydrogen, methyl or ethyl, and $R_3$ is hydrogen or methyl. Under the specified conditions, the amine and possibly decomposition products thereof react in a complex manner with the ammonia-treated fiber, and carbon, and possibly additional nitrogen and hydrogen as well, is chemically incorporated into the composition. Thus there is produced a fiber which consists essentially of carbon (C), B, N, O and H. In order for such a fiber to be useful as an intermediate in the preparation of a boron carbide fiber, the heating in the amine atmosphere must be continued for a time sufficient to incorporate at least about 15% C. into the ammonia-treated fiber. Such a fiber, produced as stated and consisting essentially of B, N, O, H and at least about 15% C, is hereinafter referred to as an amine-treated fiber to distinguish it conveniently from the various other types of fibers discussed herein.

Finally, in accordance with the present invention, an amine-treated fiber as described may be heated in an inert atmosphere at a temperature of from about 2000° C. to about 2350° C., whereupon a complex reaction occurs rapidly within the fiber and boron carbide is produced, accompanied by the dissipation of N, O and H and considerable loss of weight. Brief heating under the stated conditions thereby results in the production of a fiber which consists essentially of boron carbide.

The invention will be further described with reference to the following example, which is intended to illustrate and not to limit the invention, and the subsequent detailed discussion of the preferred embodiments.

DESCRIPTION OF THE PREFERRED EMBODIMENTS

Example

A conventional electrical resistance wire-wound tube furnace is employed, having a vertical, cylindrical, heat-resistant glass tube with an inner diameter of approximately 2.5 cm. as the reaction chamber. A hollow, cylindrical thermocouple protection tube extends downwardly into the glass tube concentrically with the longitudinal axis thereof, having its closed end located in the hot zone of the glass tube. A thermocouple is disposed within the closed end of the protection tube in the hot zone, and lead wires connected to the thermocouple pass through the protection tube to the exterior of the furnace where they are connected to instrumentation suitable for measuring the temperature in the hot zone. The closed end of the thermocouple protection tube is provided with several external horizontal protrusions which are adapted to retain the fibers to be treated within the hot zone of the vertical glass tube.

A 1.8 g. loose, fluffy mass of boric oxide fibers having a diameter of about 4 microns is placed within the hot zone of the glass tube at room temperature. A current of ammonia is established through the tube by the introduction of ammonia gas into the bottom of the tube at a flow rate of 1.8 l./min., the tube being vented to the atmosphere at its upper end. While continuing the current of ammonia, the temperature is raised to 300° C. at a rate of temperature rise of 200° C./hr. and further to 450° C. at a rate of 50° C./hr. The ammonia reacts with the boric oxide under these conditions to produce ammonia-treated fibers having a diameter of about 4 microns and consisting essentially of B, N, O and H.

The ammonia current is then discontinued and replaced by a current of gaseous methylamine having a flow rate of 0.4 l./min. While maintaining the methylamine current, the temperature is raised to 700° C. and held here for 10 hours during which time the methylamine and possibility decomposition products thereof react with the fibers to chemically incorporate carbon therein. The methylamine flow is then discontinued and the furnace is permitted to cool to room temperature, whereupon the resulting mass of 1.6 g. of amine-treated fibers is removed. The fibers have a diameter of about 4 microns and consist essentially of, by analysis: B, 25.49%; C, 23.16%; N, 31.41%; O and H (total, by difference), 19.94%.

To convert the amine-treated fibers to boron carbide fibers, a conventional horizontal carbon tube resistance furnace is employed having a carbon tube with an inner diameter of approximately 2.5 cm. A current of argon is established through the tube at a flow rate of 0.3 l./min. to provide an inert atmosphere, and the furnace is heated to 2270° C. as determined by an optical pyrometer sighted on the wall of the tube at the hot zone. A 0.0356 g. portion of the amine-treated fibers is placed in a graphite boat which is inserted into the hot zone of the furnace tube, left there for 2 minutes, and then removed to the cold end of the furnace tube, where the fibers are permitted to cool almost to room temperature in the argon current. The resulting fibers weigh 0.0114 g., representing a loss of about 68% as compared to the weight of the amine-treated fibers. They are gray and metallic in appearance, have a diameter of about 3 microns, and have a density of 2.45 g./cc. which closely approaches the theoretical density of boron carbide, 2.5 g./cc. X-ray powder diffractometry using monochromatic copper K-alpha radiation indicates that the fibers consist essentially of boron carbide.

Although the various process steps of the invention may be carried out while employing but a single fiber of any desired length, and the invention has been so described in part herein, it is to be understood that the process steps may be, and usually are preferably, carried out while employing a plurality of fibers, as in the Example. For instance, the fibers may be in the form of a staple consisting of a mass of relatively short fibers, or in a bundle of continuous filaments of considerable length. The fibers should preferably not be very tightly compressed together during the heating in ammonia or the amine, so that there is adequate contact between each fiber and the ammonia or amine atmosphere to permit the desired reaction to occur.

It will also be understood that, while vertical or horizontal tube furnaces such as those employed in the Example are particularly convenient for carrying out the various process steps according to the invention, other types of furnaces familiar to those skilled in the art and capable of generating the requisite temperature and containing the required atmosphere may be used, such as induction furnaces.

Now considering the various aspects of the invention in detail, boric oxide fibers suitable for the practice of the invention may readily be prepared by conventional techniques such as those employed in producing glass fibers. Thus, for example, continuous boric oxide fibers may be spun from a boric oxide melt, being wound upon a revolving spool. Alternatively, boric oxide fibers may be blown in staple form by the conventional technique of causing a jet of any suitable gas to impinge upon a thin falling stream of molten boric oxide. Fibers having a diameter of a few microns or less, as well as coarser fibers, may easily be produced by spinning, and diameters in the submicron range can be attained by blowing.

For the purposes of the invention, there appears to be no critical minimum diameter of the boric oxide fibers which may be employed, but they must have a diameter no greater than about 10 microns. When fibers of greater diameter are employed, the ammonia, and even more so the amine, may have difficulty penetrating to the core of fibers, and the resulting ammonia-treated and/or amine-treated fibers are likely to be non-uniform in composition throughout their cross section.

Ammonia treatment is carried out by heating the boric oxide fibers in an ammonia atmosphere up to a final temperature of from about 350° C. to about 600° C. at a rate of temperature rise of up to about 5000° C./hr. The mechanism of the reaction which occurs between the boric oxide throughout the fibers and the ammonia is quite complex and no attempt will be made here to describe it in detail. It appears that as the fibers are heated in ammonia at temperatures below about 350° C., a simple addition occurs and addition compounds of boric oxide and ammonia are formed. As the temperature reaches and exceeds about 350° C., however, a more complex nitriding reaction begins, and continues with increasing temperature, with incipient formation of boron nitride occurring and hydrogen and oxygen being liberated in the form of water, although some hydrogen and oxygen remain within the composition; and it is such fibers that are useful in the present invention because they are amenable to the chemical incorporation of carbon by being heating in an amine of the class described. If the temperature of the ammonia treatment exceeds about 600° C., the formation of boron nitride and liberation of water approaches nearer to completion, resulting in fibers which are not amenable to subsequent carbon incorporation by the amine treatment.

Preferably, the starting temperature for the ammonia treatment should be less than about 250° C., at which temperature the boric oxide fibers, not having undergone any reaction with the ammonia, may begin to soften and possibly cohere. This factor is not quite so important when only a single fiber is employed rather than a plurality thereof.

If the temperature is raised too rapidly during the ammonia treatment, i.e., faster than about 5000° C./hr., there may be insufficient time for the desired reaction with the ammonia to occur throughout the fibers, and the boric oxide fibers may soften and melt, or only the surface of the fibers may react while the core remains substantially unreacted. At the other extreme, however, the rate of temperature rise may be as slow as desired, although a rate of at least about 5° C./hr. is preferred as a practical matter in the interest of conserving time. Avoiding the extremes, rates of from about 10° C./hr. to about 100° C./hr. have been found to be eminently suitable. If desired, the fibers may be held at the final temperature in the ammonia atmosphere for some time, but in general there is no advantage in doing so.

The heating is carried out in an ammonia atmosphere. In some types of furnaces having a large capacity, and especially when only a small quantity of fibers is to be treated, the atmosphere may be established at the outset of the heating cycle and remain static. In other types of furnaces, such as tube furnaces, especially when a substantial quantity of fibers is to be treated, it may be necessary to maintain the ammonia atmosphere as a current through the furnace, at a flow rate which is sufficient to remove the gaseous by-products produced during the reaction and to provide a constant fresh supply of ammonia for the reaction. In such a case, it may be desirable to preheat the ammonia to a suitable temperature before introducing it into the furnace, to avoid decreasing temperature within the furnace.

As has been stated, the resulting ammonia-treated fibers consist essentially of B, N, O and H. The N is present to the extent of at least about 20 percent. The fibers have approximately the same diameter as the precursor boric oxide fibers.

The ammonia-treated fibers are subjected to an amine treatment by heating them at a temperature of from about 600° C. to about 1000° C., and preferably from about 700° C. to about 800° C., in a gaseous atmosphere of an aliphatic amine of the class described. The amine treatment may conveniently be carried out in the same furnace as is used for the ammonia treatment, immediately following the ammonia treatment, as in the Example, but may be carried out as an entirely separate step if desired. The essential purpose of the amine treatment is to incorporate C into the chemical structure throughout the fibers so that, upon subsequent heating in an inert atmosphere, the B and C may react to produce boron carbide. The reaction between the ammonia-treated fibers and the amine and possibly the decomposition products formed therefrom at the temperatures employed appears to be exceedingly complex, and is apparently reversible. At temperatures below about 600° C., the desired reaction does not proceed significantly and little or no carbon is introduced into the ammonia-treated fibers. At temperatures above about 1000° C., the reverse reaction appears to be favored and any C already incorporated into the fibers tends to be dissipated therefrom. Moreover, temperatures above about 1000° C. tend to enhance decomposition of the amine. At temperatures between about 600° C. and about 1000° C., however, effective incorporation of C occurs, and the required minimum C content of about 15% may be achieved by holding the fibers at the selected temperature within the stated range for a suitable time. In general, about 2–3 hours suffices, although longer periods of up to about 10–15 hours may result in the incorporation of greater amounts of C, and amine-treated fibers containing as much as about 30% C have been produced. After about 10–15 hours, no significant additional incorporation of C usually occurs, and while further amine treatment is permissible, it is seldom of any advantage. It should be noted that it is usually advantageous to incorporate as much C in the ammonia-treated fibers as is reasonably possible, for it appears that some of the C is often dissipated upon subsequent heating in an inert atmosphere.

The class of amines suitable for the practice of the invention has been specified hereinbefore. All of the amines within the specified class possess a characteristic which is essential, viz, their molecular size is sufficiently small as to enable them to penetrate into the ammonia-treated fibers so that C can be incorporated throughout the fibers. Such amines as dimethylamine, trimethylamine, ethylamine and allylamine are particularly effective by virtue of their relatively small molecular size, and methylamine is the most preferred, it having been found that maximum C incorporation can be achieved by the use thereof. When relatively large-molecule amines such as pyridine and piperidine are employed, little or no C incorporation is found to occur. It will be observed that all of the amines within the specified class are either gases or liquids at room temperature, and all are gases at the temperatures which may be employed for the amine treatment. Moreover, all are relatively stable and not susceptible to very rapid decomposition at the temperatures employed, and although some decomposition may occur, it does not appear to be seriously detrimental.

As in the ammonia treatment, a relatively large volume of the gaseous amine may be employed as a static atmosphere for the treatment of a relatively small quantity of fibers, while in other cases the amine atmosphere must be a current of the gaseous amine flowing through the furnace at a sufficient rate to continually remove any gaseous reaction by-products and provide a constant fresh supply of amine for the reaction. When a current is used, it may be desirable to preheat the gaseous amine to a suitable temperature prior to introducing it into the furnace, to avoid decreasing the temperature within the furnace. It will be apparent that amines which are liquid at room temperature may be readily converted to the gaseous state by heating.

The amine-treated fibers have a diameter approximately the same as that of the ammonia-treated fibers from which they were prepared. They consist essentially of B, C, N, O and H, More particularly, extensive experimentation has shown that amine-treated fibers produced as described herein and which can serve as intermediates to be converted to fibers consisting essentially of boron carbide by the process described herein typically consist essentially of from about 20% to about 35% B, from about 15% to about 30% C, from about 20% to about 40% N, and a total of from about 10% to about 30% oxygen and hydrogen. In general, the more C incorporated in the fibers, the lower the percentage of B and N, although it may also be noted that the reaction of the ammonia-treated fibers with the amine may also increase the N content of the ammonia-treated fibers. It may further be noted that the individual amounts of oxygen and hydrogen in the amine-treated fibers are extremely difficult, if not impossible, to ascertain.

The amine-treated fibers may be converted to boron carbide fibers by heating them briefly at a temperature of from about 2000° C. to about 2350° C., and preferably from about 2200° C. to about 2300° C., in an inert atmosphere. During the process, B and C present in the fibers react to produce boron carbide; N, O and H, and possibly some C, are dissipated, and accordingly a considerable weight loss occurs. The diameter of the fibers often decreases somewhat, sometimes by as much as 25% or more, indicating that some densification may occur during or after the reaction.

The conversion process must be carried out at a temperature of at least about 2000° C., for at lower temperatures the conversion to boron carbide is generally incomplete, although some boron carbide may be produced. The maximum temperature for the conversion process is dictated by the melting point of boron carbide, about 2350° C. It is desirable to place the amine-treated fibers directly into a furnace which has been preheated to the selected temperature, for if they are placed into a cooler furnace which is subsequently heated to the required temperature a considerable amount of C may be dissipated before the conversion temperature is reached.

The heating is carried out in an inert atmosphere, that is, an atmosphere which is inert with respect to the reacting materials and the boron carbide produced at the temperature employed, such as argon, helium, neon, nitrogen, hydrogen or carbon monoxide. A current of such a gas through the furnace may be employed at a flow rate sufficient to remove the gaseous reaction products, if desired, but a static atmosphere is quite suitable because the essential components of the boron carbide to be produced are already present in the amine-treated fibers and need not be supplied by the atmosphere.

The heating is carried out for a time sufficient to produce fibers consisting essentially of boron carbide, and the lower the temperature, the longer the time. Thus at 2300° C., conversion to boron carbide is usually substantially complete within a minute or two, while at 2000° C., a slightly longer period of perhaps ten minutes may be required. Since the boron carbide fibers produced are stable, heating for a longer period is permissible, if desired, but generally offers no advantage. Following conversion, the boron carbide fibers are preferably allowed to cool in the inert atmosphere to avoid oxidation which may result from exposure to air while at a high temperature.

The boron carbide fibers produced in accordance with the invention have a gray to black metallic appearance, and consist essentially of boron carbide as evidenced by X-ray powder diffractometry using monochromatic copper K-alpha radiation. They usually have a density of 2.2–2.5 g./cc. and most often 2.4–2.5 g./cc.

Percentages referred to herein are percentages by weight except as otherwise expressly stated or clearly indicated by the context.

While the invention has been described herein with reference to a particular example and to certain preferred embodiments, it is to be understood that various changes and modifications may be made by those skilled in the art without departing from the inventive concept, the scope of which is to be determined by reference to the appended claims.

We claim:

1. A process for the preparation of a fiber consisting essentially of B, C, N, O and H comprising heating a fiber which consists essentially of boric oxide and which has a maximum diameter of about 10 microns in an ammonia atmosphere up to a final temperature between about 350° C. and about 600° C. at a rate of temperature rise up to about 5000° C./hr. to produce an ammonia-treated fiber, and heating said ammonia treated fiber in an atmosphere of an amine having the formula

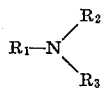

wherein $R_1$ is methyl, ethyl, propyl or allyl, $R_2$ is hydrogen, methyl, or ethyl, and $R_3$ is hydrogen or methyl, at a temperature of from about 600° C. to about 1000° C. for a time sufficient to produce an amine-treated fiber which contains at least about 15% C.

2. A process as set forth in claim 1 wherein said heating in an ammonia atmosphere is begun at a starting temperature below about 250° C.

3. A process as set forth in claim 2 wherein said rate of temperature rise is at least about 5° C./hr.

4. A process as set forth in claim 2 wherein said rate of temperature rise is between about 10° C./hr. and about 100° C./hr.

5. A process as set forth in claim 1 wherein said amine is selected from the group consisting of methylamine, dimethylamine, trimethylamine, ethylamine and allylamine.

6. A process as set forth in claim 1 wherein said amine is methylamine.

7. A process as set forth in claim 2 wherein said amine is methylamine.

8. A process as set forth in claim 7 wherein said temperature of said heating in an atmosphere of an amine is between about 700° C. and about 800° C.

9. A fiber having a maximum diameter of about 10 microns consisting essentially of from about 20% to about 35% B, from about 15% to about 30% C. from about 20% to about 40% N, and a total of from about 10% to about 30% O and H.

References Cited

UNITED STATES PATENTS

| | | | |
|---|---|---|---|
| 1,501,419 | 7/1924 | Podszus | 423—291 |
| 3,429,722 | 2/1969 | Economy et al. | 423—290 X |

GEORGE F. LESMES, Primary Examiner

L. T. KENDELL, Assistant Examiner

U.S. Cl. X.R.

8—115.5; 117—47 R, 118, Dig. 10; 161—175